(12) United States Patent
Zhou et al.

(10) Patent No.: US 9,888,632 B2
(45) Date of Patent: Feb. 13, 2018

(54) POWERED CUTTING TOOL

(75) Inventors: Haijun Zhou, Guangdong (CN);
Zhengjun Wang, Guangdong (CN)

(73) Assignee: TECHTRONIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 518 days.

(21) Appl. No.: 13/991,827

(22) PCT Filed: Dec. 30, 2010

(86) PCT No.: PCT/CN2010/080526
§ 371 (c)(1),
(2), (4) Date: Jun. 5, 2013

(87) PCT Pub. No.: WO2012/088695
PCT Pub. Date: Jul. 5, 2012

(65) Prior Publication Data
US 2013/0276313 A1 Oct. 24, 2013

(51) Int. Cl.
*A01G 3/037* (2006.01)
*B26B 15/00* (2006.01)
(52) U.S. Cl.
CPC .............. *A01G 3/037* (2013.01); *B26B 15/00* (2013.01)
(58) Field of Classification Search
CPC ...... A01G 3/037; A01G 3/0475; A01G 3/053; A01G 3/0535; A01G 3/062; A01G 3/067; A01G 3/085; B26B 15/00
See application file for complete search history.

(56) References Cited

U.S. PATENT DOCUMENTS 3,504,717 A * 4/1970 Pittman ...................... B27B 5/00
                                                                83/340
4,418,562 A * 12/1983 Sakai ...................... B23D 17/04
                                                                100/292

(Continued)

FOREIGN PATENT DOCUMENTS

| CN | 201563409 | 9/2010 |
| CN | 201591038 | 9/2010 |

(Continued)

OTHER PUBLICATIONS

Illustrated Sourcebook of Mechanical Components, Robert O. Parmley, P.E., McGraw-Hill, Copyright 2000, pp. 1-2 to 1-14.*

(Continued)

*Primary Examiner* — Jonathan Riley
(74) *Attorney, Agent, or Firm* — Michael Best & Friedrich LLP

(57) ABSTRACT

A cutting tool has a cutting head, a motor and a transmission means drivable by the motor. The cutting head comprises first and second cutting members, wherein the first cutting member is pivotably moveable with respect to the second cutting member. At least the first cutting member is drivable by the transmission means between a first angular position with respect to the second cutting member and a second angular position with respect to the second cutting member, in which a space between the respective cutting blades is closed. The transmission means is a bevel gear on the output shaft of a gearbox which conveys drive power from the motor to the drive gear. The bevel gear directly engages a bevel wheel member connected to the first cutting member and which swivels with the first cutting member about the same swivel point. A controller comprises main, first and second switches which control the motor to move the first cutting member (movable blade). The main switch acts as a main power switch whereas the first ad second switches act (Continued)

as limit switches detecting movement of said movable blade at the limits of its intended motion. The controller exerts automatic control over movement of the first cutting member in response to inputs from the first and second limit switches.

14 Claims, 3 Drawing Sheets

(56) References Cited

U.S. PATENT DOCUMENTS

| | | | | |
|---|---|---|---|---|
| 5,867,909 | A * | 2/1999 | Jeltsch | B26B 15/00 30/216 |
| 8,656,597 | B2 * | 2/2014 | Pellenc | A01G 3/037 30/194 |
| 8,813,370 | B2 * | 8/2014 | Pellenc | A01G 3/037 30/228 |
| 2004/0055164 | A1 * | 3/2004 | Molins | B26B 15/00 30/228 |
| 2009/0241351 | A1 * | 10/2009 | Maniwa | B26B 15/00 30/228 |
| 2010/0064527 | A1 * | 3/2010 | Lee | A01G 3/037 30/228 |
| 2010/0071218 | A1 * | 3/2010 | Poole | F41A 17/06 30/233 |
| 2010/0077621 | A1 | 4/2010 | Quigley et al. | |
| 2010/0180740 | A1 * | 7/2010 | Krapf | B23Q 11/0082 83/72 |
| 2010/0269355 | A1 * | 10/2010 | Yang | A01G 3/037 30/228 |
| 2011/0056082 | A1 * | 3/2011 | Nie | A01G 3/037 30/228 |
| 2013/0055575 | A1 * | 3/2013 | Delmas | B26B 15/00 30/228 |

FOREIGN PATENT DOCUMENTS

| | | |
|---|---|---|
| DE | 19849976 | 5/2005 |
| EP | 2158805 | 3/2010 |
| WO | 2010020720 | 2/2010 |

OTHER PUBLICATIONS

International Search Report for Application No. PCT/CN2010/080526 dated Sep. 22, 2011 (4 pages).

* cited by examiner

POWERED CUTTING TOOL

CROSS-REFERENCE TO RELATED APPLICATIONS

This application is a national stage filing under 35 U.S.C. 371 of International Application No. PCT/CN2010/080526 filed Dec. 30, 2010, the content of which is incorporated herein by reference in its entirety.

FIELD OF THE INVENTION

The invention relates to a powered cutting tool of the type such as secateurs and pruning tools intended particularly, but not exclusively, for cutting vegetation such as shrub or tree branches.

BACKGROUND OF THE INVENTION

Manually driven pruning tools and secateurs are well known. Powered pruning tools and secateurs are also known where a motor is provided to drive at least one of a pair of blades with respect to the other. An example of such a powered cutting tool is disclosed in EP2158805. Problems associated with known powered pruning tools and secateurs include efficiently transmitting drive from the motor to the at least one moveable blade and automatically controlling the movement of said at least one moveable blade between its open and closed positions in a safe, user-friendly and efficient manner.

OBJECTS OF THE INVENTION

An object of the invention is to mitigate or obviate to some degree one or more problems associated with known powered cutting tools, especially known powered pruning tools and secateurs.

The above object is met by the combination of features of the main claims; the sub-claims disclose further advantageous embodiments of the invention.

Another object of the invention is to provide an improved powered cutting tool for cutting vegetation.

One skilled in the art will derive from the following description other objects of the invention. Therefore, the foregoing statements of object are not exhaustive and serve merely to illustrate some of the many objects of the present invention.

SUMMARY OF THE INVENTION

Generally speaking, the invention provides a cutting tool for cutting vegetation. The cutting tool has a housing, a cutting head, a motor and a transmission means drivable by the motor. The cutting head comprises first and second cutting members, wherein the first cutting member may be pivotably moveable with respect to the second cutting member. At least the first cutting member is drivable by the transmission means between a first angular position with respect to the second cutting member and a second angular position with respect to the second cutting member, in which a space between the respective cutting blades is closed. The transmission means may be a bevel gear which may be mounted on a gearbox output shaft. The bevel gear preferably directly engages a bevel wheel member connected to the first cutting member and swivels with the first cutting member about the same swivel point. A controller comprises main, first and second switches which control the motor to move the first cutting member (movable blade). The main switch acts as a main power switch whereas the first ad second switches act as limit switches detecting movement of said movable blade at the limits of its intended motion. The controller may exert automatic control over movement of the first cutting member in response to inputs from the first and second limit switches and a user of the tool.

In a first main aspect of the invention, there is provided a cutting tool comprising: a cutting head; a motor; and a transmission means drivable by the motor; wherein the cutting head comprises first and second cutting members, the first cutting member being pivotably mounted with respect to the second cutting member and at least the first cutting member is drivable by the transmission means between a first angular position with respect to the second cutting member and a second angular position with respect to the second cutting member, in which a space between the respective cutting blades is closed; and wherein the transmission means has a drive gear which directly engages a geared drive member which is arranged to cause rotation of the first cutting member between its first and second angular positions. The first and second cutting members may have respective cutting surfaces or edges. The second cutting member may be fixedly secured to the housing of the cutting tool.

An advantage provided by the arrangement of the first main aspect of the invention is that the direct connection of the drive gear to a geared drive member improves efficiency of torque transmission from the motor to the first cutting member and results in a transmission means of simpler construction and fewer parts than known powered cutting tools.

The first and second cutting members may comprise an anvil type cutting structure in which a cutting edge of the first cutting member is arranged to move against a cutting surface of the second cutting member. Alternatively, the first and second cutting members may each have cutting edges whereby the cutting edges are moved passed each other to effect a cutting action.

The motor may be a direct current (DC) motor or a universal motor. The DC motor may be a permanent magnet DC motor.

Preferably, the cutting tool is battery-powered. The battery may be a replaceable battery. Additionally or alternatively, the battery may be a rechargeable battery. More preferably, the battery is a lithium-ion rechargeable battery.

Preferably, the geared drive member is fixed to rotate with the first cutting member to thereby cause rotation of the first cutting member between its first and second angular positions. The geared drive member may also be fixed to rotate with the first cutting member about the same axis of rotation and may be mounted on a same shaft as the first cutting member. The geared drive member may be fixedly connected to the first cutting member, or alternatively, it may be integrally formed with the first cutting member.

Preferably, the drive gear of the transmission means which directly engages the geared drive member is mounted on an output shaft of a gearbox which conveys drive power from the motor to the drive gear. Preferably also, the drive gear comprises a bevel gear.

Preferably, the geared drive member has a beveled gear portion which engages with the bevel drive gear of the transmission means.

The transmission means may comprise a reduction gearbox which may have a planetary gear transmission. The gearbox may be mounted coaxially with the motor.

Mounting the geared drive member on the same shaft as the first cutting member or forming the geared drive member integrally with the first cutting member to have a common point of rotation/swiveling also improves efficiency of torque transmission from the motor to the first cutting member and results in a transmission means of simpler construction and fewer parts than known powered cutting tools.

Preferably, the cutting tool further comprises a controller for controlling movement of the first cutting member between its first and second angular positions. The controller may have at least first and second travel switches, each of said first and second travel switches being mounted within the cutting tool such that said first travel switch detects when the first cutting member is at its first angular position and said second travel switch detects when said first cutting member is at its second angular position.

The geared drive member may have first and second cams which are arranged to respectively engage said first and second travel switched whereby said first cam engages said first travel switch when the first cutting member is in its first angular position and said second cam engages said second travel switch when the first cutting member is in its second angular position.

The controller may be configured to cause the motor to rotate in a first direction to move the first cutting member from its first angular position to its second angular position in response to a first user input.

Additionally or alternatively, the controller may be configured to automatically cause the motor to rotate in a second, reverse direction to cause the first cutting member to move from its second angular position to its first angular position after said first cutting member has reached its second angular position in response to the first user input. Preferably, the controller is configured to automatically cause the first cutting member to move from its second angular position to its first angular position after said first cutting member has reached its second angular position a predetermined period of time after the first cutting member has reached its second angular position.

This has the advantage that a single press of a main control switch, i.e. a first user input, results in a cyclic operation of the cutting tool, namely the controller controls the first cutting member to move firstly from its first open angular position to its second closed angular position and then to return to its first open angular position.

Additionally or alternatively, the controller may be configured to automatically cause the motor to rotate in a second, reverse direction to cause the first cutting member to return to its first angular position if, in response to a first user input, it is detected that the first cutting member is not already in its first angular position.

This has the advantage of preparing the cutting tool for a next cutting cycle where, for some reason, the tool became powered off on a preceding cycle part way through said cycle.

Additionally or alternatively, the controller may be configured to cause the motor to rotate in a second, reverse direction to cause the first cutting member to return to its first angular position if, within a predetermined period of time of a first user input, it is detected that the first cutting member has not moved from its first angular position to reach its second angular position.

This has the advantage of protecting the cutting tool from jamming by returning the tool to its starting position with the first cutting member in its first open angular position after detection that the first cutting member is not able to move fully from its first to second angular positions. Such an occurrence may happen where a branch received between the first and second cutting members is too hard or brittle to be cut through by the cutting members of the tool and where continued powering closed of the cutting members could damage the motor and/or transmission means.

Preferably, the cutting tool is a vegetation cutting tool.

In a second main aspect of the invention, there is provided a cutting tool comprising: a cutting head; a motor; a transmission means drivable by the motor; and a controller; wherein the cutting head comprises first and second cutting members, the first cutting member being pivotably mounted with respect to the second cutting member and at least the first cutting member is drivable by the transmission means between a first angular position with respect to the second cutting member and a second angular position with respect to the second cutting member, in which a space between the respective cutting blades is closed; and wherein the controller is configured to control movement of the first cutting member from its first angular position to its second angular position in response to a first user input and the controller is further configured to automatically cause the first cutting member to move from its second angular position to its first angular position after said first cutting member has reached its second angular position.

In a third main aspect of the invention, there is provided a cutting tool comprising: a cutting head; a motor; a transmission means drivable by the motor; and a controller; wherein the cutting head comprises first and second cutting members, the first cutting member being pivotably mounted with respect to the second cutting member and at least the first cutting member is drivable by the transmission means between a first angular position with respect to the second cutting member and a second angular position with respect to the second cutting member, in which a space between the respective cutting blades is closed; and wherein the controller is configured to control movement of the first cutting member from its first angular position to its second angular position in response to a first user input and the controller is further configured to automatically cause the first cutting member to return to its first angular position if, in response to said first user input, it is detected that the first cutting member is not already in its first angular position.

In a fourth main aspect of the invention, there is provided a cutting tool comprising: a cutting head; a motor; a transmission means drivable by the motor; and a controller; wherein the cutting head comprises first and second cutting members, the first cutting member being pivotably mounted with respect to the second cutting member and at least the first cutting member is drivable by the transmission means between a first angular position with respect to the second cutting member and a second angular position with respect to the second cutting member, in which a space between the respective cutting blades is closed; and wherein the controller is configured to control movement of the first cutting member from its first angular position to its second angular position in response to a first user input and the controller is further configured to cause the first cutting member to return to its first angular position if, within a predetermined period of time of said first user input, it is detected that the first cutting member has not moved from its first angular position to reach its second angular position.

In a fifth main aspect of the invention, there is provided a method of manufacturing a cutting tool, comprising the step of assembling a cutting head, a motor and a transmission means to provide a cutting tool according to any one of other main aspects of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Figure 1:
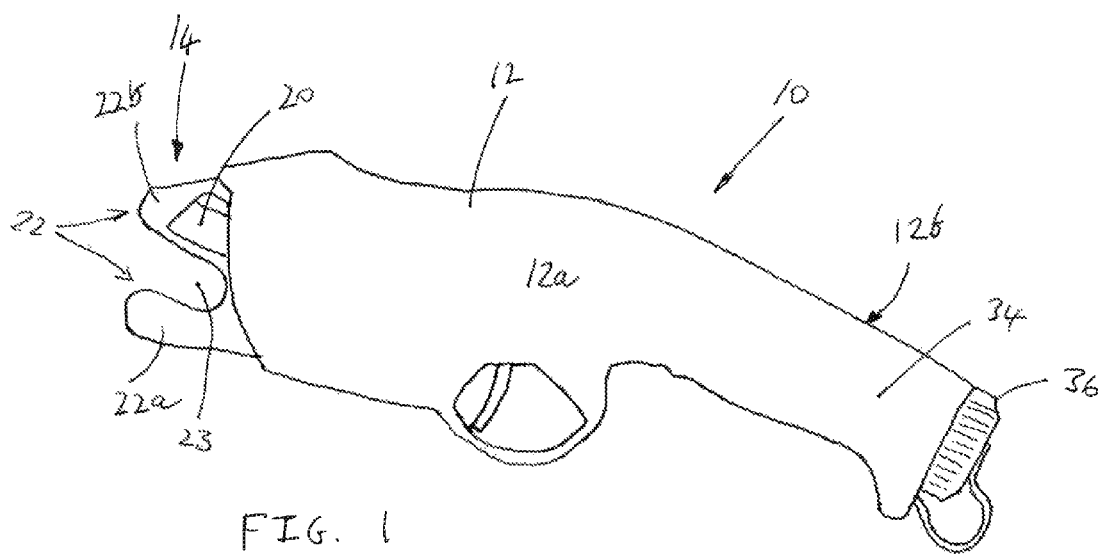
FIG. 1 is a perspective view of an embodiment of a cutting tool in accordance with the invention.
Figure 2:
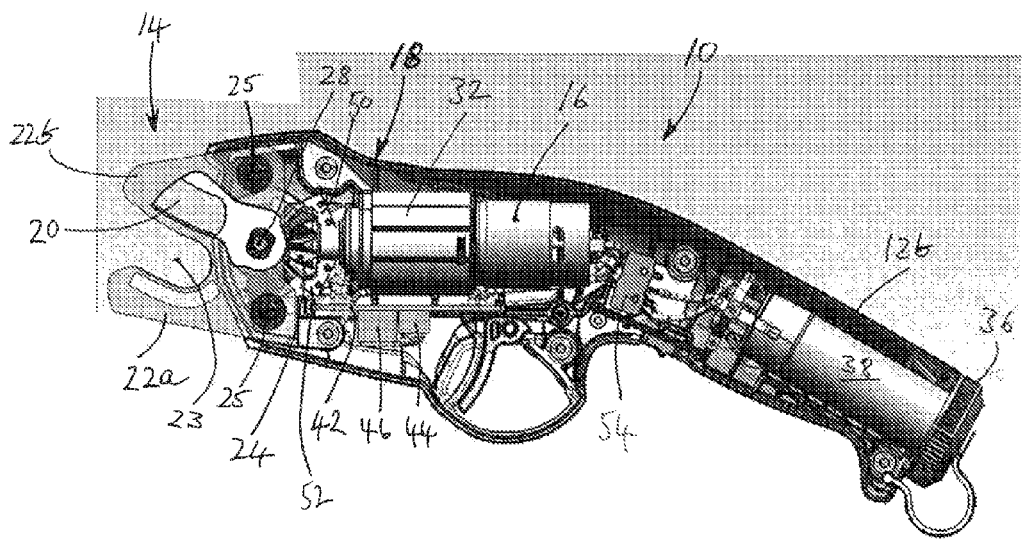
FIG. 2 is a perspective view of the principal components of the cutting tool of FIG. 1 in which the upper half of the tool housing is removed for ease of viewing said components.
Figure 3:
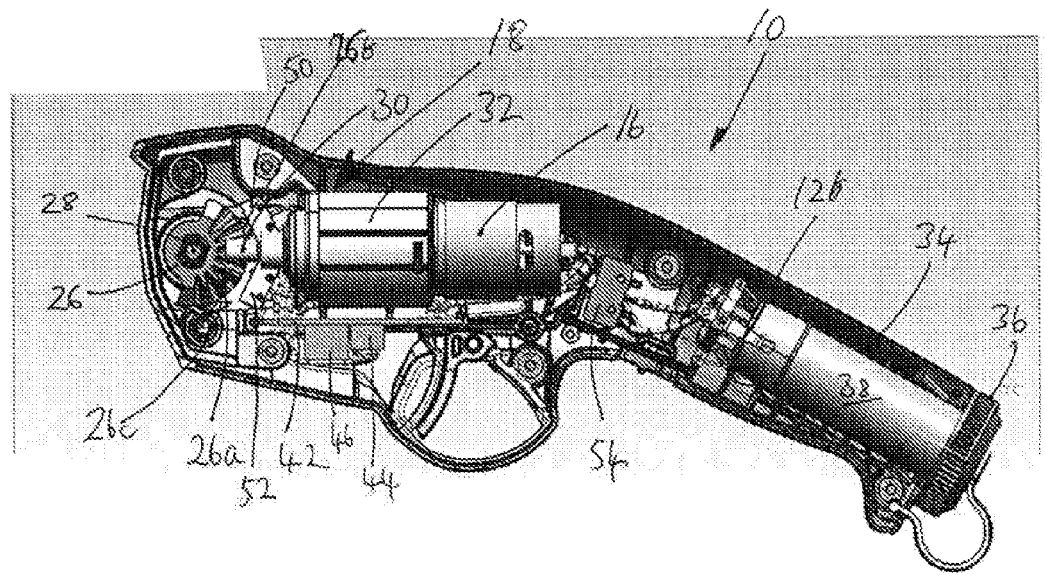
FIG. 3 is a further perspective view of the principal components of the cutting tool of FIG. 1 in which the upper half of the tool housing, the cutting head and the drive gear are removed for ease of viewing.

Referring to FIGS. 1 to 3, a cutting tool 10 comprises a housing 12, a cutting head 14, a motor 16; and a transmission means 18 drivable by the motor 16. The housing 12 may be of the split type comprising first and second halves 12a,b as can be best seen from a comparison of FIGS. 1 and 2. In FIG. 2, the first or upper half 12a of the housing (as viewed in the drawings) has been removed to reveal the internal components of the cutting tool 10.

The motor 16 may comprise a permanent magnet DC motor, but, as would be apparent to one skilled in the art, any suitable motor could be utilized in the cutting tool 10 of the invention.

The cutting head 14 comprises first and second cutting members 20, 22. The first cutting member 20 is pivotably mounted with respect to the second cutting member 22. In this embodiment, the second cutting member 22 is fixedly secured to the housing 12. The second cutting member 22 comprises an almost square shaped plate having a lower blade portion 22a and an upper guide portion 22b. The lower blade portion 22a and upper guide portion 22b define therebetween a space or slot 23 for receiving, in use, material to be cut such as a tree branch or the like. The lower blade portion 22a of the second cutting member 22 may have a sharpened upper cutting edge where the lower blade portion 22a forms part of a scissor type cutting arrangement, or an upper flat surface forming an anvil where the lower blade portion 22a acts as an anvil to the first cutting member 20. The second cutting member 22 is fixedly secured to the housing 12 by means of screws 25, although other fixture means could be employed. However, as will be appreciated by one skilled in the art, the present invention is not limited to powered cutting tools where one of the two opposing blades or cutting members must be fixedly secured to the housing. In some not shown embodiments of the invention, the second cutting member may also be pivotally moveable with respect to the first cutting member. In other words, both the first and second cutting members may be pivotally mounted in the housing such that they can be driven towards and away from each other.

In the embodiment of FIGS. 1 to 3, the first cutting member 20 is drivable by the transmission means 18 between a first angular position with respect to the second cutting member 22 and a second angular position with respect to the second cutting member 22, in which the space or slot 23 between the respective cutting blades is closed, i.e. the first angular position can be considered as the first cutting member open position whereas the second angular position can be considered as the first cutting member closed position. The space 23 between the first and second cutting members 20, 22 comprises the space to receive a tree or shrub branch or the like for cutting. In its open position, a lower sharpened cutting edge of the first cutting member 20 is protected by the upper guide portion 22b of the second cutting member 22.

The transmission means 18 has a drive gear 24 which directly engages a geared drive member 26 which is arranged to cause rotation of the first cutting member 20 between its first and second angular positions. The geared drive member 26 is fixed to rotate with the first cutting member 20 to thereby cause rotation of the first cutting member 20 between its first and second angular positions. The geared drive member 26 is preferably fixed to rotate with the first cutting member 20 about the same axis of rotation and may be mounted on a same shaft 28 as the first cutting member 20. Both the first cutting member 20 and the geared drive member 26 may comprise separately formed components which are then keyed or otherwise fixed for rotation on the shaft 28. However, in other not shown embodiments, the geared drive member 26 may be formed integrally with the first cutting member 20 whereby mounting of the integrally formed first cutting member and geared drive member onto the shaft 28 requires a single assembly operation. In the embodiment of FIGS. 1 to 3, the drive gear 24 is a bevel gear which is arranged to directly mesh with a beveled gear portion 26a of the geared drive member 26. The beveled gear portion 26a may comprise a generally semi-circular portion of the geared drive member 26.

The drive gear 24 is preferably mounted on an output shaft 30 of a gearbox 32 of the transmission means 18 whereby the gearbox 32 conveys drive power from the motor 16 to the drive gear 24. The gearbox 32 may comprise a reduction gearbox which may have a planetary gear mechanism. The gearbox 32 is mounted coaxially with the motor 16.

The planetary gearbox 32 may have a gear ratio in the order of 555.24. The bevel gear ratio (gear ratio of the drive gear 24 to the geared drive member 26) may be in the order of 17/11. Thus, the effective gear ratio of the tool is 555.24*17/11=858, meaning that the torque of the first cutting member 20 is 858 times the torque of the motor 16. By using a drive gear 24 that meshes directly with the geared drive member 26 where the geared drive member 26 is mounted to rotate with the first cutting member 20 on the same shaft 28 results in fewer components and less space required for the drive mechanism of the tool of the present invention compared to known powered cutting tools for cutting vegetation and yet with excellent torque transmission.

Mounting the geared drive member 26 on the same shaft 28 as the first cutting member 20 or forming the geared drive member integrally with the first cutting member to have a common point of rotation/swiveling improves efficiency of torque transmission from the motor to the first cutting member and results in a transmission means of simpler construction and fewer parts than in known powered cutting tools.

The cutting tool 10 is preferably battery-powered, being provided with a battery compartment 34 closed by a battery compartment closure member 36. One or more batteries 38 are received in the compartment 34 to power the cutting tool 10. The battery may be a replaceable battery. Additionally or alternatively, the battery may be a rechargeable battery. More preferably, the battery is a lithium-ion rechargeable battery.

Figure 5:
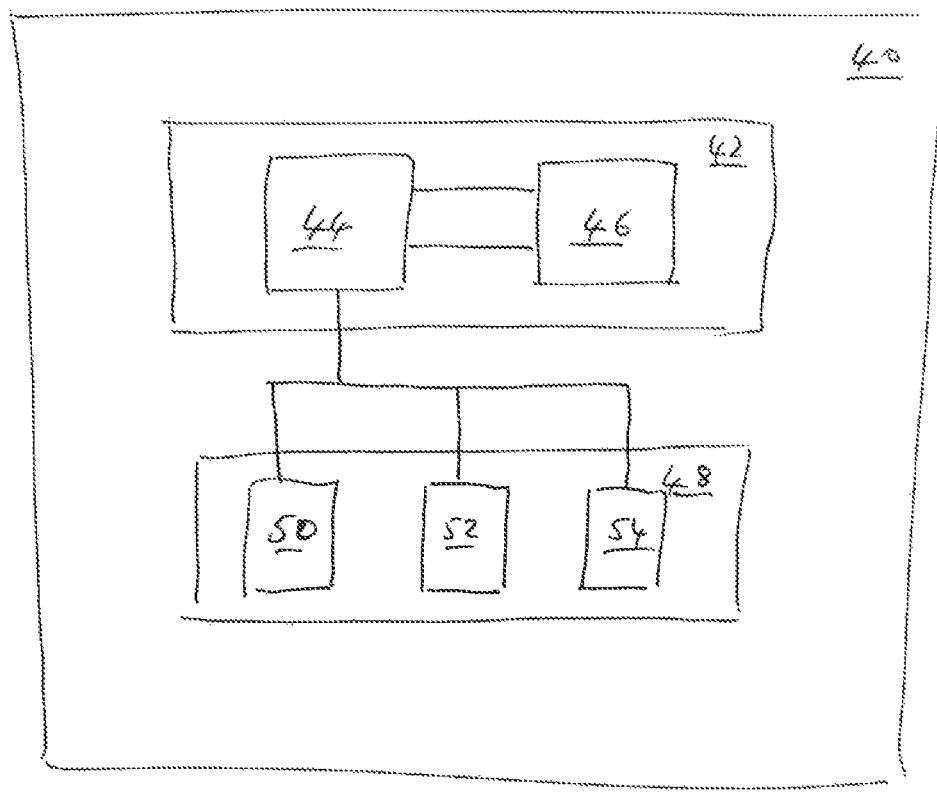
FIG. 5 is a schematic view of the controller for all embodiments of the invention.

The cutting tool 10 has a controller 40 for controlling movement of the first cutting member 20 between its first and second angular positions. The controller 40 is embodied on a printed circuit board (PCB) 42 mounted within the housing 12 of the tool 10. The controller 40 (FIG. 5) comprises suitable circuit components for effecting the control methodology hereinbelow described. In a preferred arrangement, the controller 40 comprises a processor 44 for executing machine readable instructions, a memory 46 for storing said machine readable instructions and switching means 48. The switching means 48 comprises at least first and second travel switches 50, 52, each of which is mounted within the cutting tool housing 12 such that said first travel switch 50 detects when the first cutting member 20 is at its first angular position and said second travel switch 52 detects when said first cutting member 20 is at its second angular position. A main power switch 54 is also provided. The main power switch 54, when depressed, initiates a cutting cycle. At any point where the main switch 54 is released, the power tool 10 will stop.

The geared drive member 26 has first and second cams 26b,c which are arranged to respectively engage said first and second travel switches 50, 52 whereby said first cam 26b engages said first travel switch 50 when the first cutting member 20 is in its first angular position and said second cam 26c engages said second travel switch 52 when the first cutting member 20 is in its second angular position.

The controller 40 is configured to cause the motor 16 to rotate in a first direction to move the first cutting member 20 from its first angular position to its second angular position in response to a first user input, i.e. depression of the main power switch 54.

In some embodiments, the controller 40 is configured to automatically cause the motor 16 to rotate in a second, reverse direction to cause the first cutting member 20 to move from its second angular position to its first angular position after said first cutting member 20 has reached its second angular position in response to the first user input. The controller may be configured to automatically cause the first cutting member 20 to move from its second angular position to its first angular position after said first cutting member has reached its second angular position a predetermined period of time, e.g. 2 seconds, after the first cutting member has reached its second angular position.

More specifically, the method comprises a user depressing the main power switch 54 to initiate a cutting cycle. If the first cutting member 20 is in its fully opened position, i.e. the first cam 26b on the geared drive member 26 is detected to be engaged with the first travel or limit switch 50, then the controller 40 causes the motor 16 to rotate in said first direction which causes the first cutting member 20 to move to its closed position, i.e. where the second cam 26c on the geared drive member 26 engages the second travel or limit switch 52 and the controller 40 responds by stopping the motor. The controller 40 waits a predetermined time of say 2 seconds before causing the motor to run in said second, reverse direction to cause the first cutting member to return to its opened position where, once again, the first cam 26b engages the first travel switch 50 and the controller 40 then stops the motor. By this means, depressing the main power switch 54 initiates an automatic cutting cycle. At this point, releasing the main switch 54 disconnects the battery power and stops the tool 10. A further depression of the main power switch 54 will initiate another cutting cycle. In some embodiments, continued holding down of the main power switch 54 may initiate repeated cutting cycles with a predetermined delay period between each successive cutting cycle.

This has the advantage that a single press of the main control power switch, i.e. a first user input, results in a cyclic operation of the cutting tool 10, namely the controller 40 controls the first cutting member 20 to move firstly from its first open angular position to its second closed angular position and then to return to its first open angular position.

Where the cutting tool 10 has stopped midway through a cutting cycle for some reason, the controller 40 may be configured to automatically cause the motor 16 to rotate in said second, reverse direction to cause the first cutting member 20 to return to its first angular position if, in response to a first user input, it is detected that the first cutting member 20 is not already in its first fully open angular position.

More specifically, when the main power switch 54 is depressed to initiate a cutting cycle, the controller 40 determines whether the first cutting member 20 is in its open position. This is determined from detecting whether the first cam 26b of the geared drive member 26 is engaged with the first travel switch 50. If it is detected that the first cutting member 20 is not in its open position, the controller 40 causes the motor 16 to rotate in the second, reverse direction to return the first cutting member 20 to its opened position where the first cam 26b of the geared drive member 26 engages the first travel switch 50. The controller 40 then stops the motor 16. At this point, releasing the main switch 54 disconnects the battery power and stops the tool 10. A further depression of the main power switch 54 will initiate a cutting cycle now that the first cutting member is in its open starting position. In some embodiments, continued holding down of the main power switch 54 may initiate first and successive repeated cutting cycles with a predetermined delay period between each successive cutting cycle.

This has the advantage of preparing the cutting tool for a next cutting cycle where, for some reason, the tool became powered off on a preceding cycle part way through said cycle.

To reduce or prevent jamming of the tool, the controller may be configured to cause the motor 16 to rotate in a second, reverse direction to cause the first cutting member 20 to return to its first angular position if, within a predetermined period of time of a first user input, it is detected that the first cutting member 20 has not moved from its first angular position to reach its second angular position.

More specifically, when a cutting cycle has been initiated and the first cutting member 20 has still not reached the closed position, as determined by the failure within a set period of time (e.g. 2 seconds) from start of the cutting cycle for the second cam 26c of the geared drive member 26 to engage with the second travel switch 52, the controller 40 will determine that a jam condition has occurred and cause the motor 16 to rotate in the second, reverse direction to return the first cutting member 20 to its open position. At this point, releasing the main switch 54 disconnects the battery power and stops the tool 10 allowing a user to clear any branches or the like jammed in the slop 23 of the tool 10.

This has the advantage of protecting the cutting tool 10 from jamming by returning the tool to its starting position with the first cutting member 20 in its first open angular position after detection that the first cutting member is not able to move fully from its first to second angular positions. Such an occurrence may happen where a branch received in the slot 23 between the first and second cutting members 20, 22 is too hard or brittle to be cut through by the cutting members and where continued powering closed of the cutting members could damage the motor 16 and/or transmission means 18.

The controller 40 may also be configured to detect a time period for the first cutting member 20 to return to its first angular position. If said period exceeds a predetermined period of, for example, 3 or 4 seconds, the controller 40 is configured to cause the motor 16 to stop and/or to isolate the battery power supply to thereby protect the motor 16, the transmission means 18, the controller 40 itself and any other parts of the tool 10 which may be damaged through some malfunction of the tool 10 or some obstruction to the cutting members 20, 22 of the tool, etc.

The controller 40 may also be configured to stop the cutting tool 10 where it detects that the battery has discharged to or below a threshold level. The threshold may be set at 5% or 10% of battery capacity. This feature of the control methodology protects the battery and also provides up to three months stand-by or storage time.

The controller 40 may also be configured to protect the cutting tool from an overload condition such as when the cutting members 20, 22 become jammed. Where current drawn by the motor reaches or rises above a threshold amount the controller 40 may cause the tool to stop to allow the cause of the over-current condition to be rectified.

Figure 4:
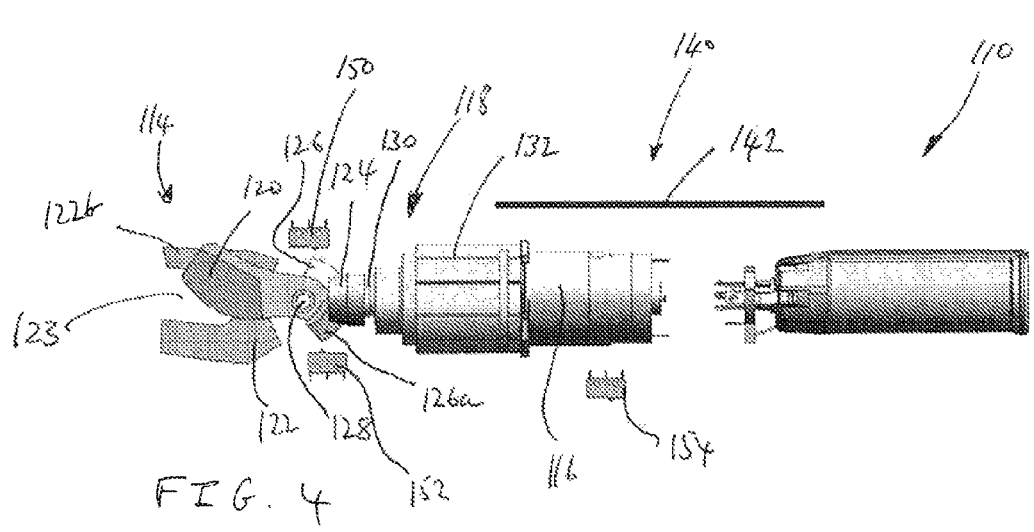
FIG. 4 is an exploded perspective view of the principal components of a cutting tool in accordance with another embodiment of the invention.

FIG. 4 shows an exploded perspective view of the principal components of a cutting tool 110 in accordance with another embodiment of the invention, although the housing is not shown. The components of this embodiment are largely similar to those of the first embodiment depicted by FIGS. 1 to 3 and, unless otherwise stated, function in the same manner as the first embodiment. The components of the embodiment of FIG. 4 comprise a cutting head 114, a motor 116; and a transmission means 118 drivable by the motor 116. The cutting head 114 comprises first and second cutting members 120, 122. The first cutting member 120 is pivotably mounted with respect to the second cutting member 122. The second cutting member 122 is fixedly secured to the housing (not shown). The first and second cutting members 120, 122 define therebetween a space or slot 123 for receiving, in use, material to be cut such as a tree branch or the like.

The first cutting member 120 is drivable by the transmission means 118 between a first angular position with respect to the second cutting member and a second angular position with respect to the second cutting member, in which the space or slot 123 between the respective cutting blades is closed. In this embodiment, a lower sharpened cutting edge of the first cutting member 120 is not protected by an upper guide portion 122*b* of the second cutting member 122.

The transmission means 118 has a drive gear 124 which directly engages a geared drive member 126 which is arranged to cause rotation of the first cutting member 120 between its first and second angular positions. The geared drive member 126 is fixed to rotate with the first cutting member 120. The geared drive member 126 is preferably fixed to rotate with the first cutting member 120 about the same axis of rotation and may be mounted on a same shaft 128 as the first cutting member 120. The drive gear 124 is a bevel gear which is arranged to directly mesh with a beveled gear portion 126*a* of the geared drive member 126. The beveled gear portion 126*a* may comprise a generally semi-circular portion of the geared drive member 126.

The drive gear 124 is preferably mounted on an output shaft 130 of a gearbox 132 of the transmission means 118 whereby the gearbox 132 conveys drive power from the motor 116 to the drive gear 124. The gearbox 132 may comprise a reduction gearbox which may have a planetary gear mechanism. The gearbox 132 is mounted coaxially with the motor 116.

The cutting tool 110 is battery-powered.

The cutting tool 110 has a controller 140 for controlling movement of the first cutting member 120 between its first and second angular positions. The controller 140 is embodied on a printed circuit board (PCB) 142. The controller 140 (FIG. 5) comprises suitable circuit components for effecting the control methodology as hereinbefore described. The controller 140 comprises a processor 44 for executing machine readable instructions, a memory 46 for storing said machine readable instructions and switching means 48. The switching means 48 comprises at least first and second travel switches 150, 152 each of which is mounted with respect to the first cutting member 120 such that said first travel switch 150 detects when the first cutting member 120 is at its first angular position and said second travel switch 152 detects when said first cutting member 120 is at its second angular position. A main power switch 154 is also provided.

The geared drive member 126 has first and second cams (not shown) which are arranged to respectively engage said first and second travel switches 150, 152 whereby said first cam engages said first travel switch 150 when the first cutting member 120 is in its first angular position and said second cam engages said second travel switch 152 when the first cutting member 120 is in its second angular position.

In general, the invention provides a cutting tool having a cutting head, a motor and a transmission means drivable by the motor. The cutting head comprises first and second cutting members, wherein the first cutting member is pivotably moveable with respect to the second cutting member. At least the first cutting member is drivable by the transmission means between a first angular position with respect to the second cutting member and a second angular position with respect to the second cutting member, in which a space between the respective cutting blades is closed. The transmission means is a bevel gear on the output shaft of a gearbox which conveys drive power from the motor to the drive gear. The bevel gear directly engages a bevel wheel member connected to the first cutting member and which swivels with the first cutting member about the same swivel point. A controller comprises main, first and second switches which control the motor to move the first cutting member (movable blade). The main switch acts as a main power switch whereas the first ad second switches act as limit switches detecting movement of said movable blade at the limits of its intended motion. The controller exerts automatic control over movement of the first cutting member in response to inputs from the first and second limit switches.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A cutting tool comprising;
   a cutting head;
   a motor;
   a main control switch; and
   a transmission drivable by the motor;
   wherein the cutting head includes a first cutting member and a second cutting member, the first cutting member being pivotably mounted with respect to the second cutting member and movable with respect thereto between an open position, where the first cutting member is positioned at a first angular position with respect to the second cutting member in which the first cutting member is spaced from the second cutting member, and a closed position, where the first cutting member is positioned at a second angular position with respect to the second cutting member in which a gap between the first cutting member and the second cutting member is closed;
   wherein the transmission has a drive gear which directly engages a geared drive member which is arranged to transmit torque between the motor and the geared drive causing the rotation of the first cutting member between the open and closed positions;
   wherein the cutting tool further comprises a controller in operative communication with the motor and the main control switch, the controller being configured to control the movement of the first cutting member between the open and closed positions;
   wherein the controller is configured to send a signal to the motor in response to a single, first user input to the main control switch initiating the cutting cycle, and wherein the signal to the motor causes the cutting member to
   a) rotate toward the closed position if the first cutting member is in the open position when the single, first user input occurs,
   b) rotate toward the open position if the first cutting member is in the closed position when the single, first user input occurs,
   c) initially rotate only toward the open position if the first cutting member is not in the open position or the closed position when the single, first user input occurs, and
   d) rotate toward the open position if, within a predetermined period of time after the single, first user input occurs initiating the cutting cycle the first cutting member has not reached the closed position.

2. The cutting tool of claim 1, wherein the geared drive member is fixed to rotate with the first cutting member.

3. The cutting tool of claim 2, wherein the geared drive member is fixed to rotate with the first cutting member about the same axis of rotation.

4. The cutting tool of claim 3, wherein the geared drive member is mounted on a same shaft as the first cutting member.

5. The cutting tool of claim 4, wherein the geared drive member is fixedly connected to the first cutting member.

6. The cutting tool of claim 4, wherein the geared drive member is integrally formed with the first cutting member.

7. The cutting tool of claim 1, wherein the drive gear of the transmission means which directly engages the geared drive member is mounted on an output shaft of a gearbox which conveys drive power from the motor to the drive gear.

8. The cutting tool of claim 7, wherein the drive gear of the transmission comprises a bevel gear.

9. The cutting tool of claim 8, wherein the geared drive member has a beveled gear portion which engages with the bevel drive gear of the transmission.

10. The cutting tool of claim 1, wherein the controller has a first travel switch and a second travel switch, each of the first and second travel switches being mounted to the cutting tool such that the first travel switch detects when the first cutting member is at the open position and the second travel switch detects when the first cutting member is at the closed position.

11. The cutting tool of claim 10, wherein the geared drive member has a first cam and a second cam which are arranged to respectively engage said first and second travel switches whereby said first cam engages the first travel switch when the first cutting member is in the open position and the second cam engages the second travel switch when the first cutting member is in the closed position.

12. The cutting tool of claim 1, wherein the controller is configured to automatically send signals to the motor causing the first cutting member to move from the closed position to the open position after said first cutting member has reached the closed position in response to the first user input.

13. The cutting tool of claim 12, wherein the controller is configured to automatically send signals to the motor causing the first cutting member to move from the closed position to the open position a predetermined period of time after the first cutting member has reached the closed position.

14. The cutting tool of claim 1, wherein the cutting tool is a vegetation cutting tool.

* * * * *